Figure 1:
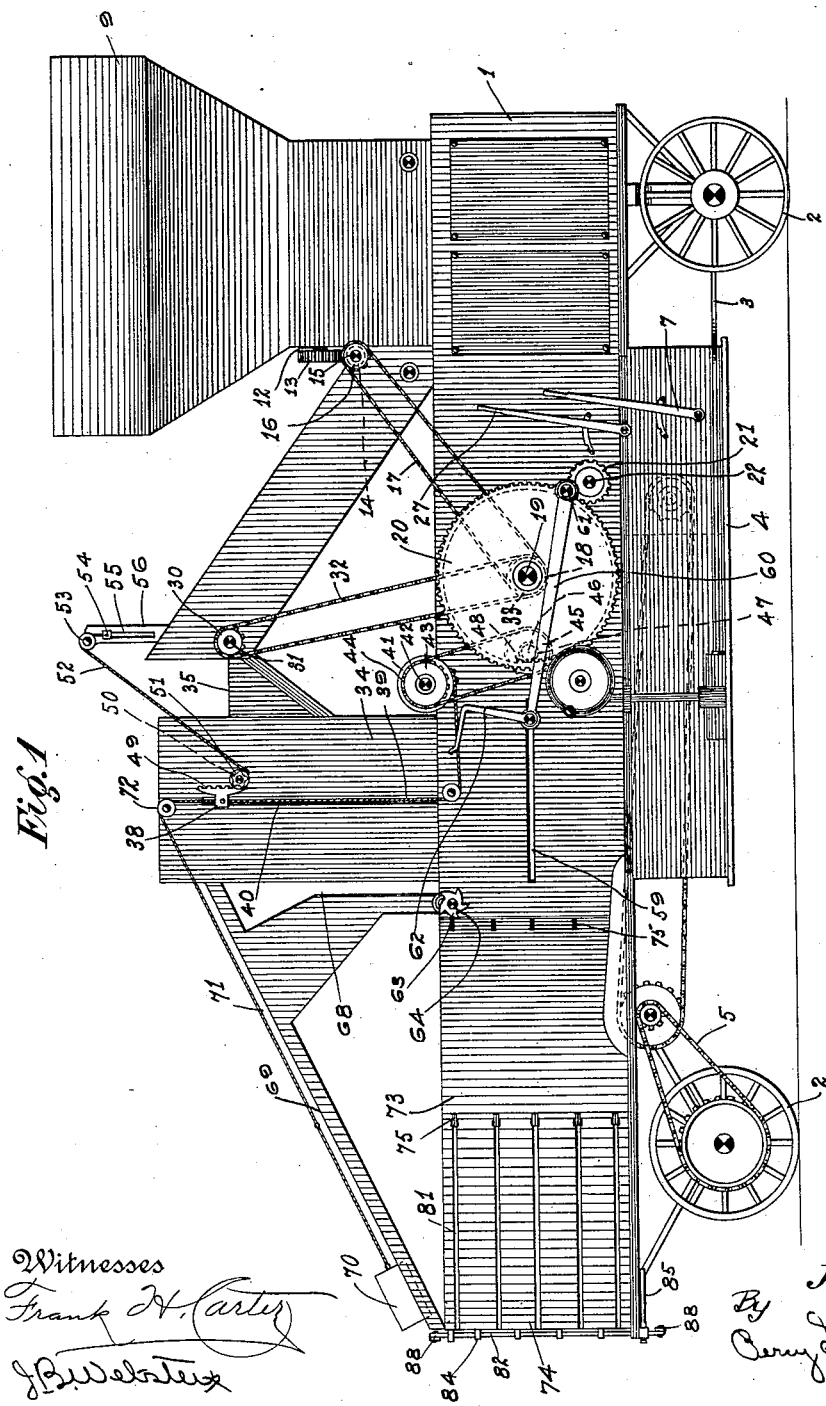

J. L. COOK.
HAY BALING MACHINE.
APPLICATION FILED JUNE 22, 1912.

1,069,112.

Patented Aug. 5, 1913.
3 SHEETS—SHEET 1.

Witnesses
Frank H. Carter
J. B. Webster

Inventor
J. L. Cook
By
Ceney D. Webster
Attorney

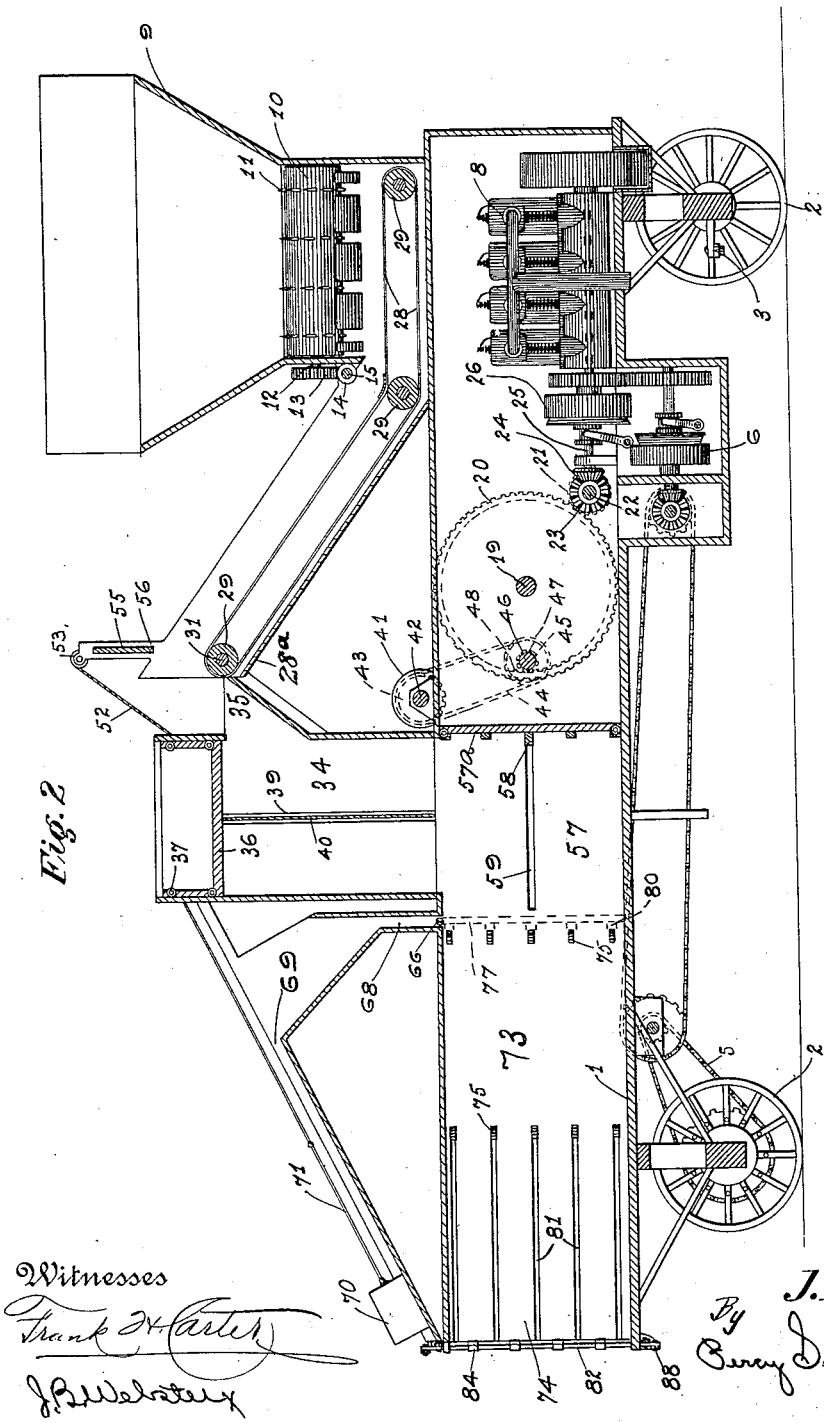

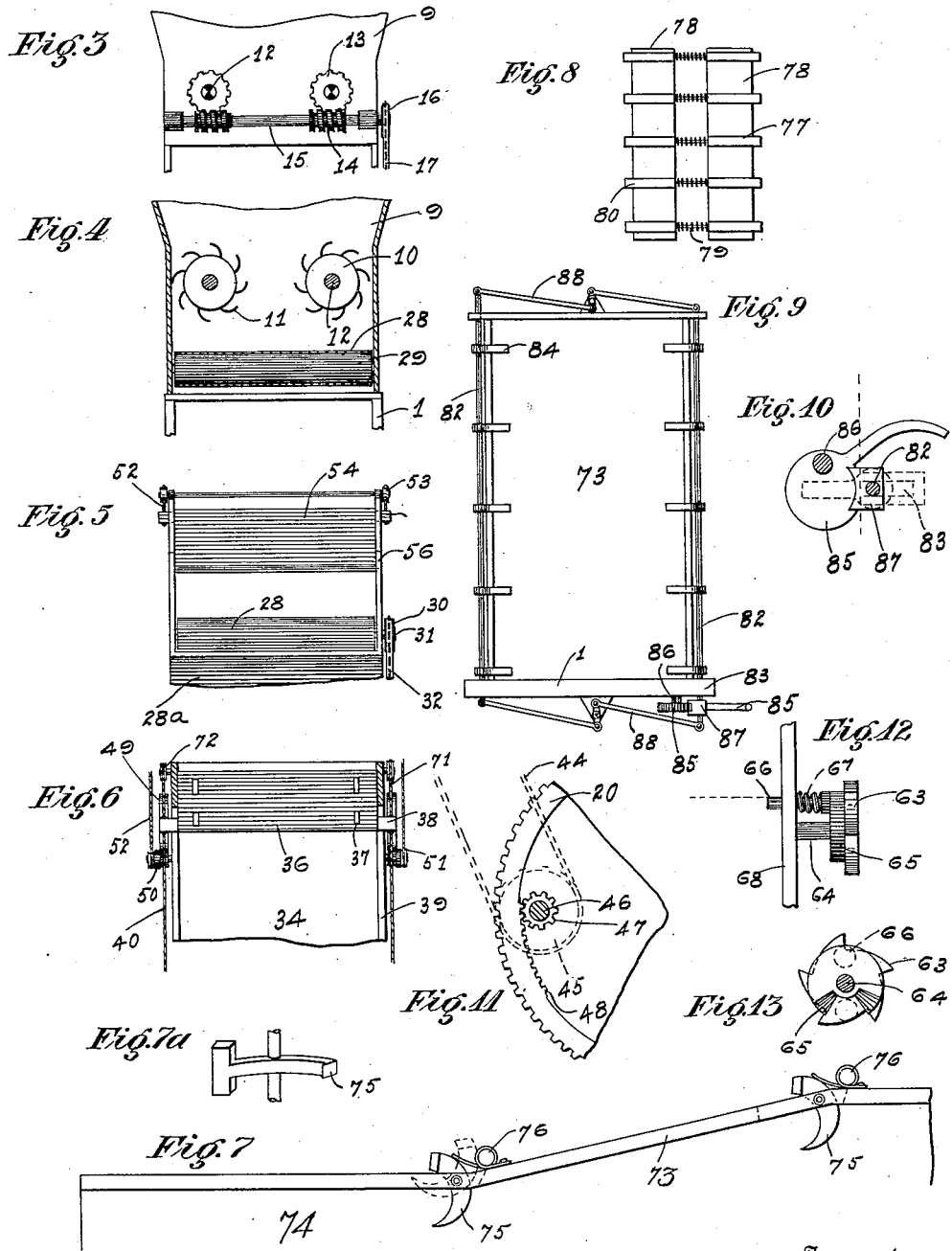

UNITED STATES PATENT OFFICE.

JAMES L. COOK, OF SACRAMENTO, CALIFORNIA, ASSIGNOR OF FORTY-NINE ONE-HUNDREDTHS TO OVID H. ROGERS, OF SACRAMENTO, CALIFORNIA.

HAY-BALING MACHINE.

1,069,112.   Specification of Letters Patent.   Patented Aug. 5, 1913.

Application filed June 22, 1912. Serial No. 705,214.

*To all whom it may concern:*

Be it known that I, JAMES L. COOK, a citizen of the United States, residing at Sacramento, in the county of Sacramento, State of California, have invented certain new and useful Improvements in Hay-Baling Machines; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in hay baling machines, the object of the invention being to produce a machine in which the hay may be continuously and rapidly baled by means of power carried by the machine itself, which power can be also used for propelling the machine from place to place.

A further object of the invention is to produce a baling machine in which each bale may be baled in a uniform manner and of substantially the same weight in an exceedingly close and compact bale.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

In the drawings similar characters of reference indicate corresponding parts in the several views.

Figure 1 is a side elevation of the complete machine. Fig. 2 is a sectional view of the same. Fig. 3 is a fragmentary view of a hay-feed operating worm gear. Fig. 4 is a fragmentary sectional view of a hay-feed mechanism. Fig. 5 is a fragmentary front view of a stop-feed device. Fig. 6 is a partly sectional view of a pressing mechanism. Fig. 7 is a top fragmentary view of a press releasing mechanism. Fig. 7ª is a perspective view of a releasing dog. Fig. 8 is a front view of an expanding pressing panel. Fig. 9 is end elevation of the press showing the bale releasing mechanism. Fig. 10 is an eccentric device for operating the same. Fig. 11 is a fragmentary view of a gear mechanism. Fig. 12 is a fragmentary view of a spring releasing device. Fig. 13 is a front elevation of the ratchet wheel for the same.

Referring now more particularly to the characters of reference on the drawings, 1 represents the main body of the machine, mounted on suitable wheels 2, the front pair having a steering means 3 operated from a platform 4 on the frame 1, the rear pair having a chain gear mechanism 5 running through a clutch 6, operated from said platform 4 by means of a lever 7 to a gas engine 8, inclosed in the body 1 of the machine. Mounted above said gas engine is a hopper 9 in the waist of which are located two rollers 10 spaced apart, said rollers having teeth 11 at suitable intervals. On the shafts 12 of said rollers and outside the hopper are gears 13 meshing with worms 14 on a shaft 15, said shaft being driven by a chain sprocket 16, a chain 17 connecting same with a sprocket 18 on a shaft 19, said shaft 19 having also a gear wheel 20 mounted thereon meshing with a smaller gear 21 on a shaft 22, on which is mounted inside the body 1, a bevel gear 23, engaging with another gear 24 on a shaft 25, connected to the gas engine through a clutch 26 operated by a lever 27 from platform 4. Running directly below said rollers 10 is a belting elevator 28 running upward in a chute 28ª mounted on suitable rollers 29, the topmost of which is driven by a chain sprocket 30 on a shaft 31 of said roller, chain 32 and a sprocket 33 on the shaft 19.

The elevator 28 discharges into a chamber 34 through an opening 35. Running in said chamber 34 is a pressing member or follower 36, having small side friction rollers 37, and lugs 38 extending to the outside through a vertical slot 39 in chamber 34. Cables 40 are fastened on one end, to lugs 38, and on the other to a drum 41 on a shaft 42, said shaft 42 having thereon a chain sprocket 43 connected by chain 44 to a sprocket 45 on a shaft 46, said shaft having a gear wheel 47 thereon meshing with teeth 48, located on the interior of gear 20, there being just sufficient of such teeth 48 to cause rope 39 to wind around drum 41 enough to raise and lower member 36 the required distance in chamber 34.

Mounted on each side on lugs 38 are rack gears 49 meshing with gears 50, said gears 50 being fastened to small drums 51 around which are wound cables 52 running over pulleys 53 located above the end of elevator 28, said cables being fastened also to a dropboard 54 running in grooves 55 in uprights 56 for the purpose as will appear.

In a longitudinal chamber 57 below chamber 34 is a pressing head or follower 57$^a$, having a cross piece 58 extending through grooves 59 in body 1. On the outer end of said cross piece 58 are connecting rods 60 being operated by the gear wheel 20 by means of crank pins 61 in the rim of gear wheel 20, spaced from the center of the same so that the throw of rods 60 and pressing head 58 shall be sufficient to accomplish its purpose as will appear. Fastened onto rods 60 at the end nearest the cross pieces 58 are bent arms 62, adapted to engage ratchet wheels 63, said wheels 63 adapted to rotate on shafts 64, cams 65 adapted to turn with wheels 63 being on the inner faces thereof. Above said shafts are pins 66, having springs 67 on their outer ends, said pins extending through the sides of, and into, an open vertical chute 68 for the purpose as will appear. Said vertical chute leads from an upwardly slanting chute 69 in which slides a weight 70, having a divided rope 71 running over pulleys 72 and fastened to the upper ends of lugs 38.

Located at the rear of the machine and part of body 1 is a long chamber 73, narrowing down somewhat at its outer end as at 74. The sides of said chamber 33 are provided at intervals with pivoted dogs 75 which protrude inwardly into such chamber 73 in pairs. Said dogs are so constructed and so controlled by means of springs 76 as to permit expanding panels 77 to pass the same when moving toward the outer end of the chamber 73, but to act and hold such panels against any backward movement in said chamber 73. Said member 77 is composed of two parts 78 the same being spaced from each other, but connected by socketed springs 79, the distance between same being sufficient to allow them to assume the shape of chamber 73 where it contracts at its outer end. The outer ends of cross pieces 80 extend through slots 81 in chamber 73. At the rear of chamber 73 and on each side are located vertical shafts 82 mounted in slotted bearings 83, said shafts having a plurality of short inwardly projecting arms 84. A hand operated eccentric member 85 on a shaft 86 is adapted to engage with a piece 87 on one of said shafts 82. By means of toggle joints 88 connecting the ends of shafts 82, turning the eccentric 85 causes said shafts 82 to move outwardly in their slotted bearings for the purpose as will appear.

The operation is as follows: A quantity of hay is dumped into the hopper 9. From there it is pulled down onto conveyer 28 by rollers 10. Conveyer 28 carries a certain quantity up and into chamber 34. Previous to this, a member 77 (of which several must be kept on hand) is placed in position in the chamber 73 below chute 68. As soon as a predetermined quantity of hay has fallen into chamber 34 and 73 between members 57$^a$ and 77, pressing member 36 commences to descend, pressing the hay entirely into chamber 57. At the same time, drop-board 54 having been released by the rack 49 unwinding rope 52 from drum 51 by the passage downward of members 36 and lugs 38, falls onto conveyer 28, thus preventing any more hay from entering chamber 34. As soon as member 36 has reached the bottom of its stroke, and while still in that position, head 57 commences to move forward further compressing the hay and pushing it and member 77 past one set of dogs 75 and into the narrowed part of chamber 73 till said member 77 abuts against the second set, this distance being the size of a bale of hay, the first set of dogs preventing the bale from backing up. Meanwhile another member 77, having been placed on the chute 69, is carried up by weight 70 till it falls into chute 68, where it is held above chamber 73 by pins 66, till rods 60 reach the outer end of their stroke when arms 62, engaging with ratchets 63 and turning same, cause pins 66 to fall into the depression in cams 65, thus releasing member 77, which then falls into chamber 73 between member 57$^a$ and the hay. By a continued operation of the gear wheel 20, member 57$^a$ and 36 return to their original positions, drop-board 54 is lifted up from conveyer 28, a fresh quantity of hay is introduced and the same operation is repeated. This time, however, the first bale already in the machine is pushed by the second bale into the last remaining space, where after being wired or otherwise tied by means of utilizing slots 81, it is released from said chamber 73 by turning eccentric 85 and releasing member 77, which had abutted against arms 84. The released member 77 is then placed on chute 69 and again utilized.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A hay baler as described comprising a horizontal chamber, a reciprocating follower in said chamber, a vertical chamber communicating with said horizontal chamber, a reciprocating follower in said vertical chamber, a panel delivering chute communicating with said horizontal chamber, a reciprocating delivering means for said panel delivering chute, said delivering means being connected with and operated by the movement of said second named reciprocating follower, as described.

2. A hay baler, as described, comprising a horizontal chamber, a reciprocating follower in said chamber, means for delivering the material to said chamber, a panel delivering chute communicating with said chamber, spring pressed pins projecting into said panel delivering chute and means operatively connected with said reciprocating follower adapted to move said pins out of said chute with the movement of said reciprocating follower, as described.

3. A hay baler, as described, comprising a horizontal chamber, a reciprocating follower in said chamber, means for delivering material to said chamber, a panel delivering chute communicating with said chamber, spring pressed pins projecting into said chute, independent shafts, recessed cams mounted on said shafts and engaging said pins, and means for turning said cams with the movement of said reciprocating follower, as described.

4. A hay baler, as described, comprising a horizontal chamber, a reciprocating follower in said chamber, a vertical chamber communicating with said horizontal chamber, a reciprocating follower in said vertical chamber, a panel delivering chute connected with said horizontal chamber, a reciprocating delivering means for said chute, a conveyer delivering chute communicating with said vertical chamber, a drop board for closing said delivering chute, means for operating said first named follower, means for operating said second named follower when said first named follower is in normal position, means for operating said reciprocating delivering means with the movement of said second named follower, and means for controlling the position of said drop board with the movement of said second named follower, as described.

5. A hay baler, as described, comprising a horizontal chamber and a vertical chamber communicating therewith, a reciprocating follower in each of said chambers, a delivery means communicating with said vertical chamber, a drop board adapted to close said delivery means, a drum mounted independently of said drop board, a cable connecting said drop board with said drum, and means operatively connected between said reciprocating follower in said vertical chamber and said drum for operating said drum with the movement of said follower, as described.

In testimony whereof I affix my signature in presence of two witnesses.

JAMES L. COOK.

Witnesses:
PERCY S. WEBSTER,
JOSHUA B. WEBSTER.

---

Copies of this patent may be obtained for five cents each, by addressing the "Commissioner of Patents, Washington, D. C."